United States Patent [19]
Wirges

[11] 3,807,796
[45] Apr. 30, 1974

[54] CONTROL MECHANISM FOR THE TILTING BACK OF A SEAT

[75] Inventor: Winfried Wirges, Koblenz, Germany

[73] Assignee: Stabilus Industrie und Handelsgesellschaft mbH, Koblenz, Germany

[22] Filed: Jan. 11, 1973

[21] Appl. No.: 322,773

[30] Foreign Application Priority Data
Jan. 18, 1972 Germany.............................. 2202160

[52] U.S. Cl.................. 297/355, 297/361, 297/379
[51] Int. Cl............................................. A47c 1/024
[58] Field of Search..................... 297/355, 379, 361

[56] References Cited
UNITED STATES PATENTS

| | | |
|---|---|---|
| 3,533,658 | 10/1970 | Gropp................................. 297/355 |
| 3,528,532 | 9/1970 | Moskow........................... 297/355 X |
| 3,407,909 | 10/1968 | Seckerson........................... 297/355 |
| 3,744,844 | 7/1973 | Nomaki.............................. 297/355 |

Primary Examiner—Francis K. Zugel
Attorney, Agent, or Firm—Hans Berman

[57] ABSTRACT

The tilting back of the driver's seat in a motorcar is held in position by a pneumatic spring whose effective length can be changed manually when a valve in the piston of the spring is opened by means of a release rod projecting from the piston rod of the spring. An operating arm can be moved on the seat to actuate the release rod and then be held in position by engaged abutments so that the seat back may be tilted manually without at the same time holding the operating arm.

9 Claims, 9 Drawing Figures

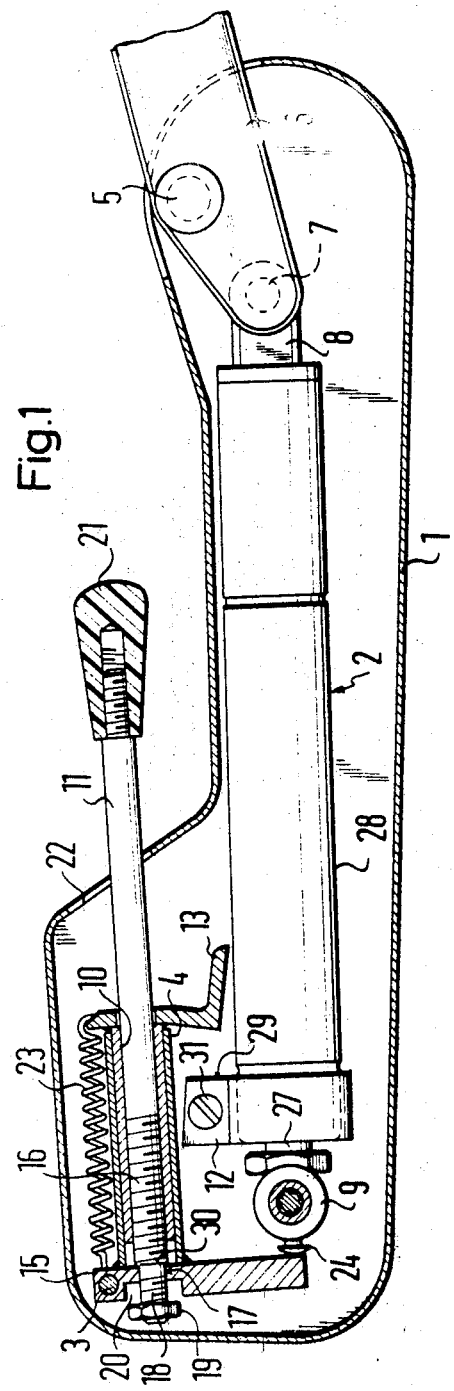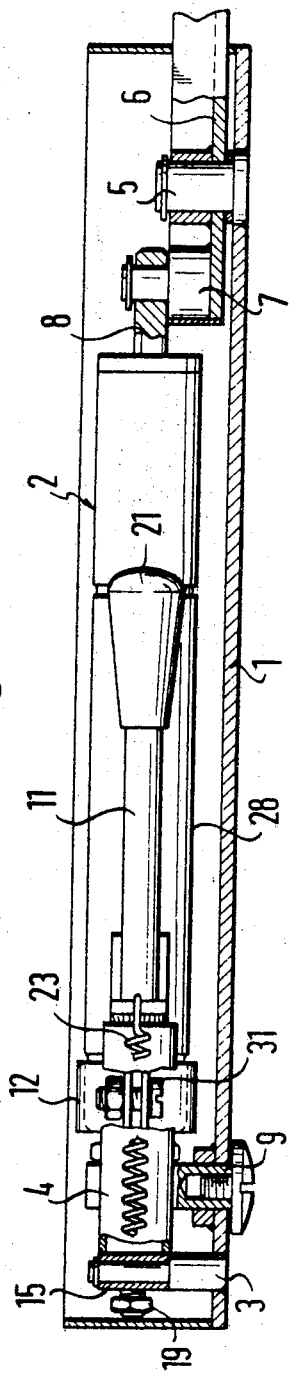

PATENTED APR 30 1974  3,807,796

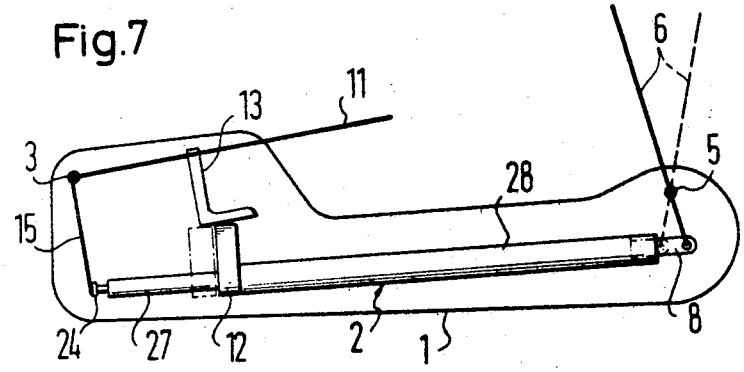
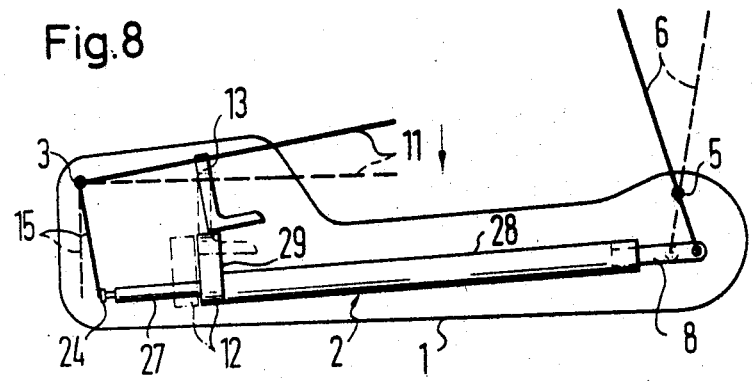
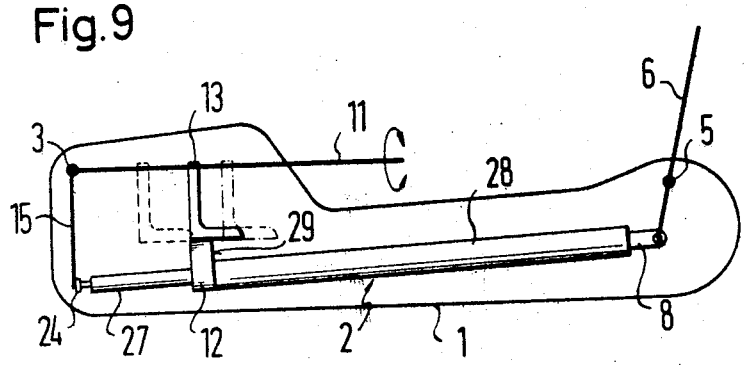

CONTROL MECHANISM FOR THE TILTING BACK OF A SEAT

This invention relates to seats having tilting backs, and particularly to a control mechanism for a tilting seat back which is held in its angular position by a pneumatic spring.

A pneumatic spring interposed between the seat back and a fixed portion of the seat can hold the back in a position which may be adjusted by shifting the piston rod of the spring axially inward and outward of the cylinder while a valve provides communication between the two compartments in the cylinder cavity axially divided by a piston on the piston rod. The inherent resiliency of the spring contributes to seat comfort, and the valve in the spring permits stepless variation in the angular position of the seat back.

Pneumatic springs have been found advantageous in the seats of a motorcar, and a driver's seat equipped with a back held in position by a pneumatic spring may be adjusted by the driver without stopping the vehicle because operation of its valve and subsequent adjustment of the seat back by the driver's back and shoulders is fast and requires only negligible effort and attention.

A pneumatic spring used with a seat back has been disclosed in German Utility Model 1,955,308, published Feb. 9, 1967. It permits manual shifting of the seat back while the valve in the spring is held open by an operating member. When the valve is opened in the known arrangement, the seat back is tilted forward, and may be tilted until it abuts against the steering wheel. This is necessary in a two-door sedan and similar vehicle for access to the rear seat. When it is desired thereafter to return the seat back of the driver's seat to its normal position, the valve operating member, conveniently located near the car floor, must be held by one hand to keep the valve open while the seat back is swung backward with the other hand, the driver not being capable of occupying the seat and moving the seat back with his shoulders under the prevailing conditions.

It is the primary object of this invention to provide a control mechanism for the tilting back of a seat which permits the seat back to be tilted forward by handling an operating member acting on the valve in the spring, and thereafter permits the seat to be returned to its normal position by hand without having to touch the operating member at the same time.

With this object and others in view, the invention provides a seat of the type described with a pneumatic spring including a cylinder member and a piston rod member axially movable into and out of the cylinder member for varying the effective length of the spring, as is usual. One of the members is fastened to a support to which the seat back is movably attached, and motion transmitting means are interposed between the other member of the spring and the seat back for transmitting motion therebetween in either direction.

The spring further includes a release element movable between a blocking position in which the effective length of the spring is held constant except for variations possible by compressing the gas in the spring, and an unblocking condition in which the spring length may be changed manually by moving the spring members relative to one another. An actuating device is interposed between an operating arm and the release element for moving the latter into the unblocking position when the arm moves on the support from a first to a second position thereof. Abutments on the arm and the spring may be engaged for holding the arm in the second position and for thereby holding the release element in its unblocking position.

Other features, additional objects, and many of the attendant advantages of this invention will readily be appreciated as the same is better understood by reference to the following detailed description of preferred embodiments of the invention when considered in connection with the appended drawing in which:

FIG. 1 shows a seat control mechanism of the invention in side elevation, with portions broken away;

FIG. 2 illustrates the device of FIG. 1 in top plan view, with portions broken away;

Figure 4:
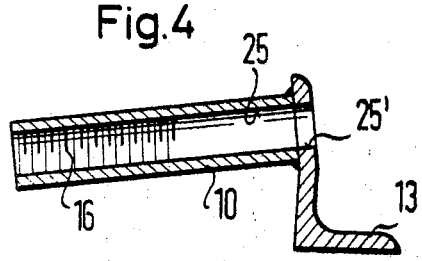
Figure 5:
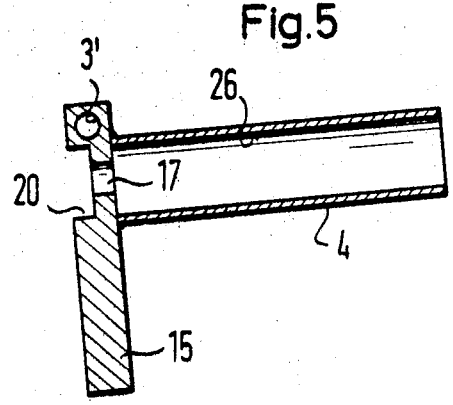
Figure 6:
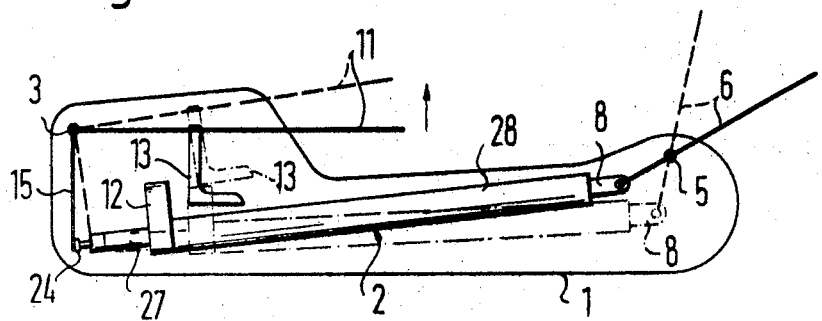

FIGS. 4 and 5 respectively illustrate individual elements of the device of FIG. 1 in side-elevational section; and FIGS. 6 to 9 diagrammatically illustrate the operation of the apparatus of FIG. 1.

Referring now the the drawing in detail, and initially to FIGS. 1 and 2, there is shown a casing 1 which forms the left side wall in the rigid base of the driver's seat in a two-door sedan, not otherwise shown. The casing 1 is partly broken away in FIGS. 1 and 2 to reveal a pneumatic spring 2 and other devices for which the casing 1 provides a support. The visible parts of the spring are a piston rod 27 and a cylinder 28. The spring is of the known type disclosed in British Pat. No. 1,217,263, French Pat. No. 1,599,204, Belgian Pat. No. 66,800, Italian Pat. No. 850,299, and the commonly owned U.S. Pat. application Ser. No. 292,814, filed on Sept. 27, 1972.

As is not specifically shown in the drawing, the inner end of the piston rod 27 carries a piston which axially divides the cavity of the cylinder 28 into two normally sealed compartments filled with air or nitrogen at a pressure much higher than atmospheric pressure. A valve in the piston is spring-biassed toward the closed position, and connects the two compartments when opened by pushing the end of a valve-release rod 24 on the outer end of the piston rod 27 inward of the cylinder cavity into an unblocking position. The rod 24 is biassed outward of the cylinder cavity into its blocking position by the non-illustrated valve spring with a force much smaller than that required for compressing the air in the cylinder 28, so that pressure applied to the rod 24 opens the valve without significantly pushing the piston rod 27 into the cylinder 28.

The operating mechanism for the rod 24 is pivotally mounted on a pin 3 fixedly fastened to the casing 1, and includes an angle lever separately illustrated in FIG. 5. One arm of the lever is a flat, elongated, actuating bar 15 which receives the pin 3 in a bore 3', and the other arm is a guide tube 4 whose inner wall 26 is smoothly cylindrical about an axis at right angles to the direction of elongation of the bar 15. A cylindrical opening 17 in the bar 15 is coaxial with, but smaller in diameter, than the bore of tube and leads into a transverse notch 20 in the longitudinal face of the bar 15 opposite the tube 4. The free end of the bar 15 abuttingly engages the rod 24 in the position of the apparatus shown in FIGS. 1 and 2.

A stub shaft 5 on the casing 1 pivotally supports the left side of the back on the driver's seat, only a frame member 6 of the seat back being illustrated. A corresponding frame member on the right side of the seat back is similarly supported on the seat base by a stub shaft in a manner not specifically shown. A shoulder pin 7 hingedly connects a free end of the frame member 6 to an eye 8 on the closed bottom wall of the cylinder 2 so that the eye 8, the pin 7, and the frame member 6 transmit motion between the spring 2 and the non-illustrated seat back. The free outer end of the piston rod 27 is hingedly attached to a pivot pin 9 on the casing 1, and thereby secured in its axial position. A pipe strap 12 is secured on the cylinder 28 adjacent the piston rod 27, and the free ends of the strap radially projecting from the cylinder 28 are connected by a clamping screw 31 to provide a radial abutment face 29, the purpose of which will presently become apparent.

A sleeve 10 is coaxially slidably received in the bore of the guide tube 4 and projects from the open end of the tube 4 to carry an approximately L-shaped abutment member 13, as is better seen in FIG. 4. The generally cylindrical inner wall 25 of the sleeve 10 is aligned with a circular opening 25' of equal diameter in one arm of the abutment 13 which is welded to the sleeve 10, and the wall 25 carries threads 16 over about one half of its axial length remote from the opening 25'.

An operating arm 11 is coaxially received in the opening 25' and the sleeve 10, and threads 16' on the arm 11 engage the threads 16. A reduced end portion 18 of the arm 11 freely passes through the opening 17 in the actuating bar 15 and its projecting part threadedly carries a lock nut 20 dimensioned to enter the notch 20, but not the opening 18, and limiting movement of the arm 11 with the sleeve 10 outward of the tube 4. The arm is biassed inward of the guide tube 4 by a helical tension spring 23, and its inward movement is limited by abutting engagement of a shoulder 30 at the root of the reduced arm portion 18 with the actuating bar 15.

Figure 3:
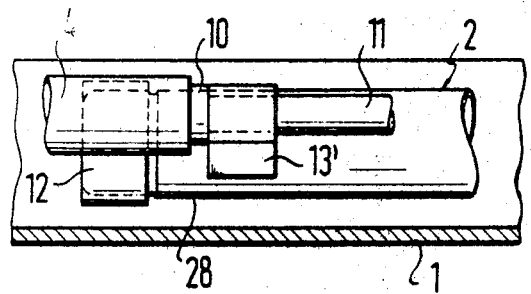
FIG. 3 illustrates a modified seat control mechanism in fragmentary side elevation.

The arm 11 projects outward of the casing 1 through a slot 22, and its longitudinally terminal portion fixedly carries a knob 21 for manually pivoting the entire operating mechanism on the pin 3, and for turning the arm 11 and thereby shifting the sleeve 10 and the abutment 13 relative to the pin 3. The arm 11 is limited to movement in a vertical plane through the axis of the cylinder 28 in the apparatus shown in FIGS. 1 and 2, but this is not essential. As is shown in FIG. 3, the arm 11 together with the coaxial sleeve 10 and tube 4 may be horizontally offset from the cylinder 28 of the pneumatic spring 2, and the pipe clamp 12, and other operating elements cooperating with the arm 11, but not explicitly shown, are turned about the cylinder axis so that the clamp may engage an abutment 13' on the sleeve 10, the abutment 13' being a flat bar. In both embodiments, the arm 11 is elongated substantially in the direction of movement of the cylinder 28.

The operation of both illustrated embodiments is the same and will be described with reference to FIGS. 6 to 9 as it applies to the apparatus illustrated in FIGS. 1, 2, 4, and 5. The modified device shown in FIG. 3 operates in the same manner, not explicitly illustrated.

As shown in FIGS. 1 and 2, the seat back is folded down completely so that the non-illustrated cushion of the front seat, the back cushion of the front seat, and the seat cushion of the rear seat jointly provide a sleeping surface, as is well known in itself. A similar position is illustrated diagrammatically in fully drawn lines in FIG. 6. If it is desired to raise the back rest of the front seat to its normal driving position, the arm 11 is raised and thereby pivoted clockwise on the pin 3 into the position shown in broken lines, whereby the actuating arm 15 depresses the rod 24, the valve in the pneumatic spring 2 is opened, and the air can move through the non-illustrated piston to expel the piston rod 27 from the cylinder cavity, whereby the cylinder 28 moves relative to the axially fixed piston rod 27 so that the overall length of the spring 2 is increased, and the seat back becomes more nearly upright, as shown by the position of the frame element 6 indicated in broken lines, and it may be stopped in this position by returning the arm 11 to the fully drawn position in which the bar 15 releases the rod 24.

The driver can readily ajdust the slope of his seat back by lifting the arm 11, which passes outward through the casing, and thereafter pulling his shoulders forward or pushing them backward until the seat back assumes the desired position, thereafter releasing the arm. The seat back follows the forward movement of the driver's shoulders as the gas in the cylinder 28 expels the piston rod 27, and the gas pressure in the cylinder 28 is readily overcome by the driver's shoulders moving backward against the back cushion. The effort involved is minimal, and the operation is so simple and quick that the car need not be stopped for making the adjustment.

When it is desired to admit a passenger to the rear seat or let a passenger leave the rear seat, the back of the driver's seat must be folded forward on the steering wheel while the driver is not in his seat. While standing outside the car, he lifts the arm 11, and keeps it in the lifted position illustrated in FIG. 7 until the piston rod 27 is fully expelled from the cylinder, and the latter moves rearwardly from the position shown in broken line to that illustrated in fully drawn lines. The abutment provided by the strap 12 is now located under the abutment member 13 and prevents lowering of the arm 11. The arm keeps the release rod 24 depressed so that the seat back of the driver's seat may be moved manually at will against the minor resistance offered by the gas in the spring 2 to shortening of the spring without simultaneously manipulating the arm 11. When the seat back has resumed its normal driving position indicated in broken lines in FIG. 8, the cylinder 28 is sufficiently near the actuating bar 15 that the rear abutment face 29 clears the abutment member 13, and the arm 11 can be lowered by the pressure of the non-illustrated valve spring acting on the rod 24, thereby fixing the inclination of the seat back.

This inclination can be selected in advance by shifting the abutment member 13 along the arm 11 with the sleeve 10. The knob 21 may be turned to move the abutment member forward or backward from the fully drawen position of FIG. 9.

The tension spring 23 is selected weaker than the non-illustrated valve spring acting on the rod 24. The spring 23 normally keeps the shoulder 30 in abutting engagement with the actuating bar 15. When the abutment member 13 clears the strap 12, the rod 24 can pivot the actuating bar 15 together with the guide tube 4 clockwise, as viewed in FIGS. 6 to 9, and such pivotal movement causes the pneumatic spring to be blocked in its position. Simultaneously, the abutment member 13 is pushed down behind the strap 12, and the arm 11 also is shifted downward. Moreover, the arm 11 together with the sleeve 10 and the abutment member 13 is moved outward of the guide tube 4 against the restraint of the spring 23 until the nut 19 abuts against the actuating bar 15 in the notch 20.

When the operating arm 11 is again lifted, the tensioned spring 23 causes the shoulder 30 of the arm 11 again to move into abutting contact with the bar 15. Simultaneously, the spring 23 holds the several elements 11, 10, 13, 15, 4 of the operating mechanism under a tension which compensates for any lost motion that might cause noise.

When it is desired to move the seat back to the fully reclining position, the arm 11 is lifted far enough that the pneumatic spring is unlocked, as described above. The seat back may then be lowered fully by hand, and the arm 11 released or pushed down to permit the rod 24 to return to its normal position in which the length of the spring 2 is fixed.

When the seat back is to be raised from the fully reclining to the normal driving position, the arm is raised slightly, whereby the gas in the spring 2 can expel the piston rod 27 and raise the seat back until the abutment member 13 engages the rear face 29 of the strap 12. Thereafter, the rod 24 is moved outward of the piston rod 27 by the non-illustrated valve spring, and the length of the spring 2 is blocked when the seat back reaches the position predetermined by the location of the abutment member 13.

Because of the lost motion of the arm 11 permitted by the nut 19, the operating mechanism for the pneumatic spring 2 is protected somewhat against damage when the seat back is subjected to a sudden excessive load, as during a rear-end collision. Even when the seat back is pressed forward vehemently, the pneumatic spring, though blocked, can be expanded slightly. After engagement of the rear face 29 of the strap 12 with the abutment member 13, such an expansion of the spring 2 causes pressure to be exerted on the member 13. Only when this pressure is strong enough to bend or otherwise damage the entire operating mechanism, the angle lever 4-15 would act on the release rod 24 and would unblock the pneumatic spring 2. Only under these unusual conditions the seat back equipped with the control mechanism of the invention would fail to perform its function of protecting the occupant.

What is claimed is:

1. A control mechansim for a seat back comprising, in combination:
   a. a support, said seat back being movably attached to said support;
   b. a pneumatic spring including
      1. a cylinder member having an axis,
      2. a piston rod member axially movable into and out of said cylinder member for varying the effective length of said spring, one of said members being fastened to said support, and
      3. a release element movable between a blocking position in which said length is held substantially constant and an unblocking position in which said length may be changed manually by moving the other one of said members relative to said one member;
   c. an operating arm movable on said support between a first position and a second position;
   d. actuating means operatively interposed between said arm and said element for moving the latter into said unblocking position when said arm moves from said first to said second position thereof;
   e. first and second abutment means on said arm and on said spring respectively, and engaged for holding said arm in said second position of the same in a predetermined relative axial position of said members of the pneumatic spring, and for thereby holding said element in said unblocking position; and
   f. motion transmitting means interposed between said other member and said seat back for transmitting motion therebetween.

2. A mechanism as set forth in claim 1, wherein said arm is elongated substantially in the direction of movement of said other member, the mechanism further comprising shifting means for shifting said first abutment means on said arm in said direction.

3. A mechanism as set forth in claim 2, wherein said shifting means include a sleeve member, engaged threads on said sleeve member and on said arm, the axis of said threads extending in said direction, said first abutment means including an abutment member fixedly fastened to said sleeve member.

4. A mechanism as set forth in claim 1, wherein said actuating means include a lever pivotally mounted on said support, one arm of said lever being tubular and receiving said operating arm, the other arm of said lever moving toward and away from said element during the pivoting movement of said lever.

5. A mechanism as set forth in claim 4, wherein said operating arm is movable in said tubular arm in said direction, said mechanism including limiting means for limiting said movement of said operating arm in said tubular arm.

6. A mechanism as set forth in claim 5, wherein said lever is formed with an opening communicating with the bore of said tubular member, and said operating arm has a reduced end portion passing through said opening and projecting therefrom outward of said bore, and a shoulder adjacent said end portion, said shoulder constituting an element of said limiting means, said limiting means further including a limiting member on said projecting end portion dimensioned to prevent passage thereof through said opening.

7. A mechanism as set forth in claim 6, further comprising a tensioning spring connecting said first abutment means on said arm to said other arm for biassing said operating arm inward of said bore.

8. A mechanism as set forth in claim 1, wherein said support includes a casing enclosing said spring, said actuating means, and said abutment means, said operating arm passing outward through said casing.

9. A mechanism as set forth in claim 8, wherein said piston rod member is hingedly fastened to said casing, and said motion transmitting means include pivot means on said cylinder member, and an element fastened to said cylinder member by said pivot means and extending outward of said casing.

* * * * *